(12) United States Patent
Krueger et al.

(10) Patent No.: US 9,846,087 B2
(45) Date of Patent: Dec. 19, 2017

(54) DEVICE FOR MEASURING THE TEMPERATURE IN A PLUG CONNECTOR BY USING A SUPERIMPOSED TEST FREQUENCY

(71) Applicant: HEIDELBERGER DRUCKMASCHINEN AG, Heidelberg (DE)

(72) Inventors: Michael Krueger, Edingen-Neckarhausen (DE); Josef Reiter, Eppelheim (DE); Andreas Schulz, Heidelberg (DE); Thomas Wolf, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 14/958,196

(22) Filed: Dec. 3, 2015

(65) Prior Publication Data

US 2016/0195435 A1 Jul. 7, 2016

(30) Foreign Application Priority Data

Dec. 3, 2014 (DE) .................. 10 2014 224 749

(51) Int. Cl.
| | | |
|---|---|---|
| *G01K 7/00* | (2006.01) | |
| *G01K 7/34* | (2006.01) | |
| *G01K 7/36* | (2006.01) | |
| *H01R 13/66* | (2006.01) | |
| *G01K 1/14* | (2006.01) | |

(52) U.S. Cl.
CPC .............. *G01K 7/34* (2013.01); *G01K 1/14* (2013.01); *G01K 7/36* (2013.01); *H01R 13/6683* (2013.01)

(58) Field of Classification Search
USPC .................................. 374/152, 184
See application file for complete search history.

(56) References Cited

U.S. PATENT DOCUMENTS

| | | | |
|---|---|---|---|
| 2012/0211278 A1 | 8/2012 | Gonzalez et al. | |
| 2012/0268290 A1 | 10/2012 | Huang et al. | |
| 2013/0136152 A1 | 5/2013 | Draeger et al. | |
| 2016/0076945 A1* | 3/2016 | Wen .................. | G01K 7/34 |
| | | | 374/184 |

FOREIGN PATENT DOCUMENTS

| | | |
|---|---|---|
| CN | 102175341 A | 9/2011 |
| CN | 103221635 A | 7/2013 |
| CN | 105190268 A | 12/2015 |
| DE | 19844893 A1 | 4/2000 |
| DE | 102007039951 A1 | 2/2009 |
| DE | 102011087262 B4 | 5/2014 |
| EP | 2472240 A1 | 7/2012 |
| JP | 60233521 A | 11/1985 |
| WO | 2014176784 A1 | 11/2014 |

* cited by examiner

*Primary Examiner* — Mirellys Jagan
(74) *Attorney, Agent, or Firm* — Laurence A. Greenberg; Werner H. Stemer; Ralph E. Locher

(57) ABSTRACT

A device for measuring the temperature in a conductor includes at least one temperature sensor emitting a signal having a frequency changing due to a temperature change. The signals of the temperature sensor are transported through the conductor and the signals are inductively or capacitively coupled out of the conductor and into an evaluation unit for measuring the temperature through coupling elements.

11 Claims, 3 Drawing Sheets

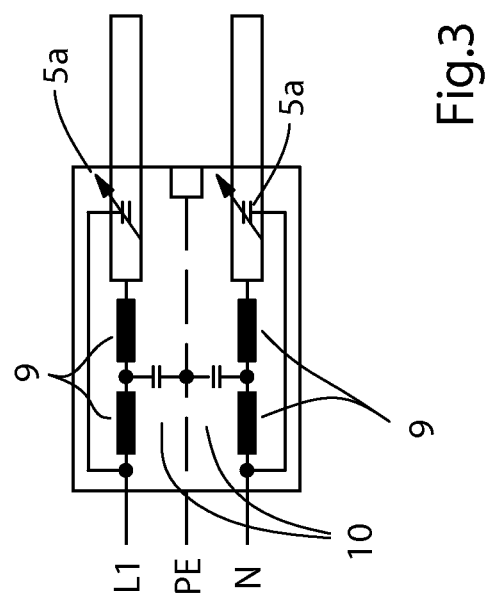

DEVICE FOR MEASURING THE TEMPERATURE IN A PLUG CONNECTOR BY USING A SUPERIMPOSED TEST FREQUENCY

CROSS-REFERENCE TO RELATED APPLICATION

This application claims the priority, under 35 U.S.C. §119, of German Application DE 10 2014 224 749.7, filed Dec. 3, 2014; the prior application is herewith incorporated by reference in its entirety.

BACKGROUND OF THE INVENTION

Field of the Invention

The present invention relates to a device for measuring or detecting the temperature in a conductor by using at least one temperature sensor emitting a signal having a frequency which changes due to a temperature change.

High-power lines and plug connectors may heat up during operation. Yet their temperature must not exceed a maximum acceptable temperature because if it does, the power line and plug connector present a risk to the environment or may be damaged. Thus the transmission of power needs to be interrupted if the maximum temperature is exceeded. That is done by actuating a corresponding switch that separates the line from the power grid. Such constellations frequently occur when batteries, in particular for electric vehicles, are being charged. In order to reduce charging time for electric vehicles to a minimum, the electric power that is transmitted is maximized, causing the charging cable and plug connector to heat up accordingly. Temperature sensors such as PCT and NTC sensors are known in the art in order to be able to monitor the temperature in the charging cable and in the plug connector. Those sensors are inserted and welded into the cable or plug connector and transmit information on the temperature in the charging cable or in the plug connector to the control unit of the electric charging system through additional signaling lines. When the temperature sensors signal that the temperature is too high, the electric charging system switches off the voltage supply to allow the charging cable and plug connector to cool down.

A disadvantage of that process is that the temperature sensors need separate signaling lines that need to be provided in the cable in addition to the power conductor. German Application DE 10 2011 087 262 B4, corresponding to U.S. Application US 2013/0136152 A1, discloses a passive temperature sensor for wireless communication that does not require a signaling cable to signal the measured temperature to a control unit. The passive temperature sensor for wireless communication is activated by and supplied with power by an alternating magnetic or electromagnetic transmission field. The connection between the passive temperature sensor and the alternating transmission field is established by a transmitter coil or an antenna. When a corresponding alternating electromagnetic field is introduced from outside, the wireless temperature sensor generates a temperature-dependent sensor signal, which is in turn emitted as an output signal. That signal may be read by a wireless receiver, allowing wireless temperature detection. A disadvantage of that device is that it requires a complex sensor/receiver unit. In addition, suitable provisions must be made for the sensor and emitter to be isolated from other radio frequencies.

Another temperature evaluation circuit is known from German Application DE 10 2007 039 951 A1. The temperature in a power semiconductor is measured. The temperature registration is electrically isolated in the circuit by an optocoupler. A temperature sensor in the form of an NTC or PTC sensor acting as a part of a resonant circuit that has a resistance R and a capacitance C is provided in the power semiconductor. The resistance R is formed by the temperature-sensitive PTC or NTC sensor. When the temperature changes, the resistance R changes, resulting in a change of the resonant circuit frequency. In that way, the changing frequency may be detected by an electronic evaluation system and conclusions may be drawn about the temperature in the semiconductor. As a result, the temperature in the power semiconductor may be monitored and the power semiconductor may be switched off when the temperature rises too high.

SUMMARY OF THE INVENTION

It is accordingly an object of the invention to provide a device for measuring the temperature in a power plug connector by using a superimposed test frequency, which overcomes the hereinafore-mentioned disadvantages of the heretofore-known devices of this general type without additional signaling lines and without complex emitter and receiver technology as required in the prior art.

With the foregoing and other objects in view there is provided, in accordance with the invention, a device for measuring the temperature in a conductor by using at least one temperature sensor emitting a signal having a frequency which changes due to a temperature change. The signals of the temperature sensor are transported through the conductor and the signals are inductively or capacitively coupled out of the conductor by coupling elements into an evaluation unit for measuring the temperature.

In accordance with the present invention, the temperature-dependent components of variable frequency may be disposed in any desired location in a conductor and act as temperature sensors. The temperature sensors may, in particular, be disposed in a plug connector at the end of a conductor. The signals of the temperature sensor are transported by the conductor itself in that a corresponding signal frequency is fed in and modified by the temperature sensor. Having had its frequency changed by the temperature sensor, the signal is then transmitted to an evaluation unit through the power conductor. The evaluation unit evaluates the signal having the frequency which has been modified by the temperature sensor, thus allowing the temperature to be measured. In this embodiment, too, the conductor and evaluation unit remain electrically isolated because the coupling out of the signal to the evaluation unit is achieved inductively or capacitively. This ensures that high voltages in the conductor cannot affect the evaluation unit. In this way, it is possible to evaluate the signals of temperatures sensors and to measure the temperature without additional signaling cables and without any complex emitter and receiver technology.

In accordance with a first embodiment of the invention, a provision is made for the temperature sensor to have a variable capacitance or a variable inductance. The capacitance in the form of a capacitor or the inductance in the form of a coil, change the capacitance or inductance as a function of the temperature. Due to the changing capacitance and the changing inductance, the frequency of the signal arriving in the evaluation unit changes and a signal having a frequency which has changed is transmitted to the evaluation unit. The evaluation unit may then measure the temperature as a function of the changing frequency. A particular advantage is that the frequency of the signal emitted by the temperature sensor changes abruptly at a predefined temperature in the conductor, in particular at 60° C. In general, 60° C. is the critical threshold that must not be exceeded in a charging cable because a higher temperature would be dangerous to the environment and might lead to damage to the cable. The abrupt change in capacitance or inductance causes the frequency to change abruptly, and an abrupt frequency change triggers a reliable signal indicating that the temperature is in a critical range. As soon as the evaluation unit detects a sudden frequency change, the voltage supply may be switched off to prevent the conductor from heating up any further. In this way, the desired degree of safety, in particular, for charging cables for electric cars is attained.

In accordance with an advantageous further embodiment of the invention, a provision is made for the signal having a frequency which has been changed by the temperature sensor as a function of the temperature to be fed into a protective earth or ground conductor by a signal generator. In order for the temperature sensors to be able to modify the frequency of the signal at all, a corresponding signal needs to be present at the temperature sensors. In accordance with the invention, this is achieved by a signal generator, which feeds the signal in through the protective earth or ground conductor. Thus in accordance with the present invention, no separate feed line is required for the frequency signal. Instead, the signal may be fed in through the protective earth or ground conductor, which is present anyway. Alternatively, the signal may be fed in through the active conductors, i.e. phase or neutral conductor. Yet in this case, only one frequency from one temperature sensor may be evaluated. It is possible for coupling elements to inductively or capacitively couple the signals out of the neutral or conductor into the signal generator and/or evaluation unit and for coupling elements to inductively or capacitively couple the signals out of the conductor into the evaluation unit for measuring the temperature in the conductor.

In accordance with another embodiment of the invention, the signal generator, the protective conductor, the temperature sensor, and the conductor form a resonant circuit having a frequency which is measured by the evaluation unit. As long as the temperature does not change, the frequency of the signal in the resonant circuit remains constant and is measured accordingly by the evaluation unit. As soon as the temperature rises or drops, the frequency in the resonant circuit will change and the change will be registered by the evaluation unit. In this way, by registering the changing frequency, the evaluation unit may draw conclusions about the corresponding temperature in the temperature sensor.

In accordance with a further aspect, a provision may be made for the resonant circuit to be configured in such a way that the signals transmitted in the conductor are in a frequency range that is not coupled into the power grid. By selecting suitable relevant components, the frequency in the resonant circuit may expediently be selected to ensure that the frequency is in a range in which the rather high-frequency signals do not spread any further but are filtered out by a corresponding transmission block formed, for instance, of a low-pass filter. This also reliably prevents the signals from reaching the power grid and causing disturbances there. The transmission block also prevents the circuits of the device for measuring the temperature to be affected by interfering signals from outside.

In accordance with an advantageous added feature, a provision is made for at least the evaluation unit and the signal generator to be disposed in an in-cable control box in a charging cable for electric vehicles. An in-cable control box is understood to be an electronic control unit that controls at least parts of the charging process in an electric vehicle. Additional tasks of the in-cable control box are to guarantee that the charging process is safe and to ensure communication with the electric charging system in the electric vehicle. By integrating the evaluation unit and the signal generator into the in-cable control box, a compact control and monitoring unit for controlling and monitoring the charging process of an electric vehicle may be provided.

In addition, a provision is made for the in-cable control box to contain a microprocessor that contains switches for interrupting at least one conductor or zero conductor. The microprocessor initiates switching processes in the charging cable that disconnect the charging cable from the power grid in the case of an overload in the charging cable. For this purpose, conductors and/or neutral or zero conductors are preferably switched off by the microprocessor using suitable switches. In accordance with the present invention, a provision is made for the microprocessor and the evaluation unit to be connected for communication with one another. An advantage of this aspect is that the temperature increase viewed as critical by the evaluation unit may be transmitted as a signal directly to the microprocessor, which may then actuate the corresponding switches in the conductor and neutral or zero conductor to prevent further heating up by interrupting the power supply.

In accordance with a concomitant feature, a provision is made for the temperature sensor in the conductor to be disposed in a connector plug for connection with an electrical socket or a power outlet. In this way, the temperature may be directly measured in the connector plug for connection with the electric car, which means that a critical temperature increase, in particular, due to a badly fitting plug connection that increases the transition resistance between the charging cable and the electric car is reliably detected and results in an interruption of the charging process. Thus even when the plug connection fits badly, no unacceptable temperature increase may occur in the plug connection, avoiding danger to the operator and damage to the charging cable and the connector.

Other features which are considered as characteristic for the invention are set forth in the appended claims.

Although the invention is illustrated and described herein as embodied in a device for measuring the temperature in a plug connector by using a superimposed test frequency, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is a schematic diagram of a power plug including a transmission block and temperature monitoring by using capacitive signal coupling.

DETAILED DESCRIPTION OF THE INVENTION

Figure 1:
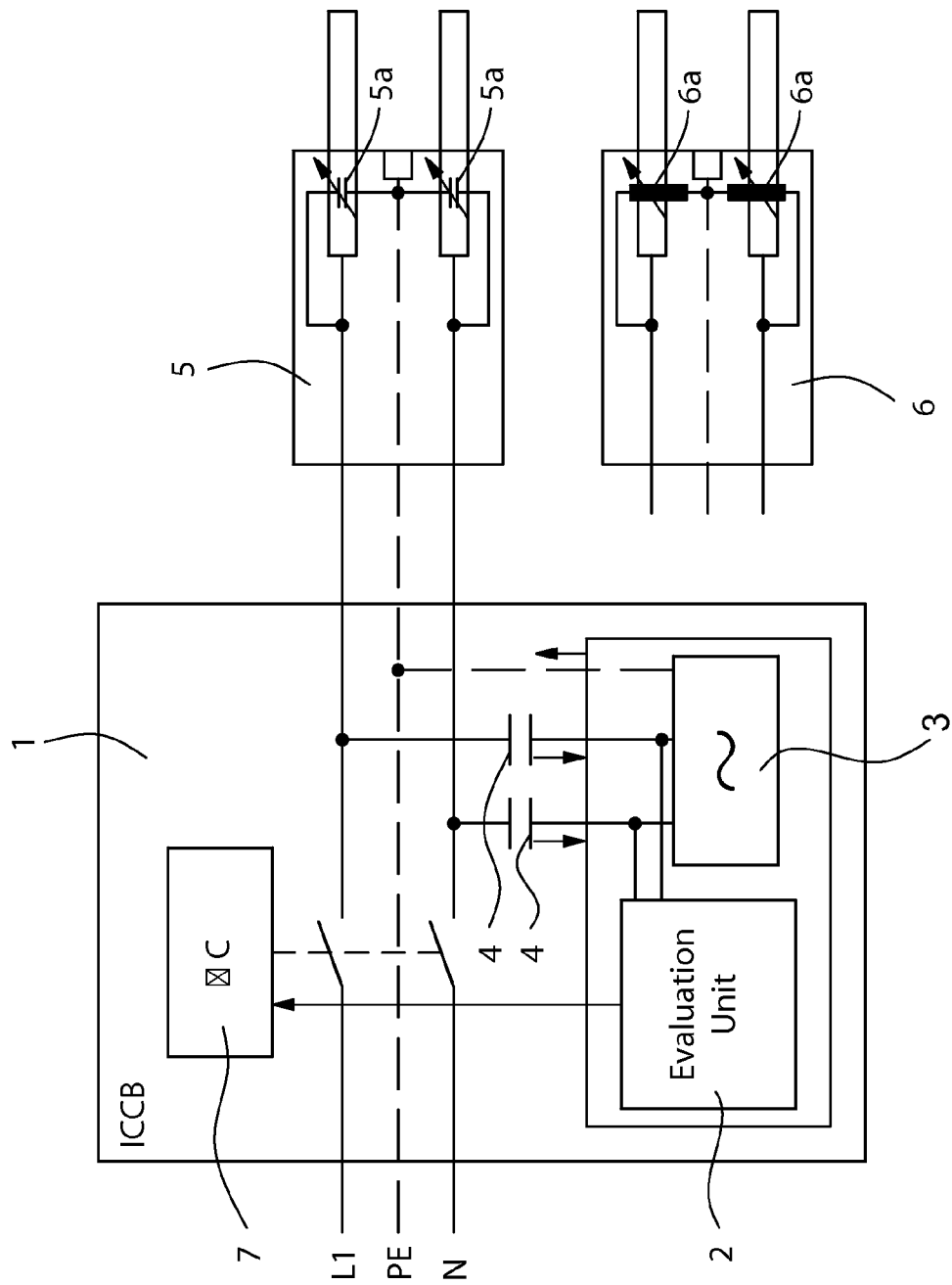
FIG. 1 is a schematic diagram of a device for monitoring the temperature in a power plug by using capacitive signal coupling.

Referring now to the figures of the drawings in detail and first, particularly, to FIG. 1 thereof, there is seen a charging cable for an electric vehicle. The charging cable includes a conductor L1 and a neutral conductor N. In addition, a protective conductor PE is provided. This charging cable transfers electric power from the power grid to an electric vehicle through a plug connection. In order to measure or detect the temperature in the plug connection at the end of the charging cable, temperature sensors 5, 6 are provided in the plug connection at the end of the conductor. The temperature sensors 5, 6 measure the temperature in the conductor L1 and in the neutral conductor N. The temperature sensors 5, 6 may have a capacitive configuration including variable capacitors 5a or an inductive configuration including variable inductors 6a. The variable capacitors 5a and the variable inductors 6a are temperature-dependent, i.e. a temperature change causes a capacitance or inductance change. The charging cable further includes a so-called in-cable control box or ICCB 1 for safety and communication functions. A task of the in-cable control box 1 usually is to monitor and control the charging process in cooperation with the electric charging system in the electric vehicle. Among others, a task of the in-cable control box 1 is to switch on the power supply. For this purpose, a microprocessor 7 providing the safety and communication functions is provided in the in-cable control box 1. The microprocessor 7, in particular, controls switches provided in the conductor L1 and in the neutral or zero conductor N for switching on or off the voltage supply from the power grid.

In accordance with the invention, the in-cable control box 1 additionally contains an evaluation unit 2 and a signal generator 3. The signal generator 3 generates an AC voltage signal that is coupled directly into the charging cable at a predefined frequency through the protective conductor PE. The signal spreads through the protective conductor PE to the temperature sensors 5, 6 at the end of the charging cable, where it passes through the variable capacitors 5a or the variable inductors 6a. The circuit is closed through the conductor L1 and the neutral conductor L, which represents the return path for the signal.

In order to keep the resonant circuit and the evaluation unit 2/signal generator 3 electrically isolated, the signal is coupled out of the conductor L1 and the neutral conductor N through coupling capacitors 4. The signal that has been coupled out in this way is registered in the evaluation unit 2, which evaluates the frequency of the registered signal. As explained above, the frequency of the registered signal changes due to the changing inductors 6a and capacitors 5a in the temperature sensors 6, 5 as a function of the respective temperature in this location. In this way, the evaluation unit 2 may measure the temperature in the plug connector of the charging cable. If the evaluation unit 2 measures an unacceptably high temperature, it emits a corresponding signal to the microprocessor 7. The microprocessor 7 then switches off the conductor L1 and the neutral conductor N by using switches to interrupt the voltage supply to the charging cable. In this way, any overheating of the charging cable and, in particular, of the plug connector at the end of the charging cable is avoided.

The in-cable control box 1 may additionally include a transmission block for preventing the temperature detection signal from being fed into and causing problems in the power grid. This additionally ensures that the resonant circuit formed of the signal generator 3, the protective conductor PE, the temperature sensors 5, 6, and the coupling capacitors 4 remains closed and the signal only circulates in the resonant circuit. Preferred capacitors 5a to be used in a sensor with variable capacitance are ceramic type 2 capacitors or capacitors including a dielectric that exhibits a corresponding abrupt capacitance change at a predefined temperature, for instance 60° C. Preferred variable inductors 6a are temperature-dependent coil cores formed of Thermoflux material manufactured by Vac.

Figure 2:
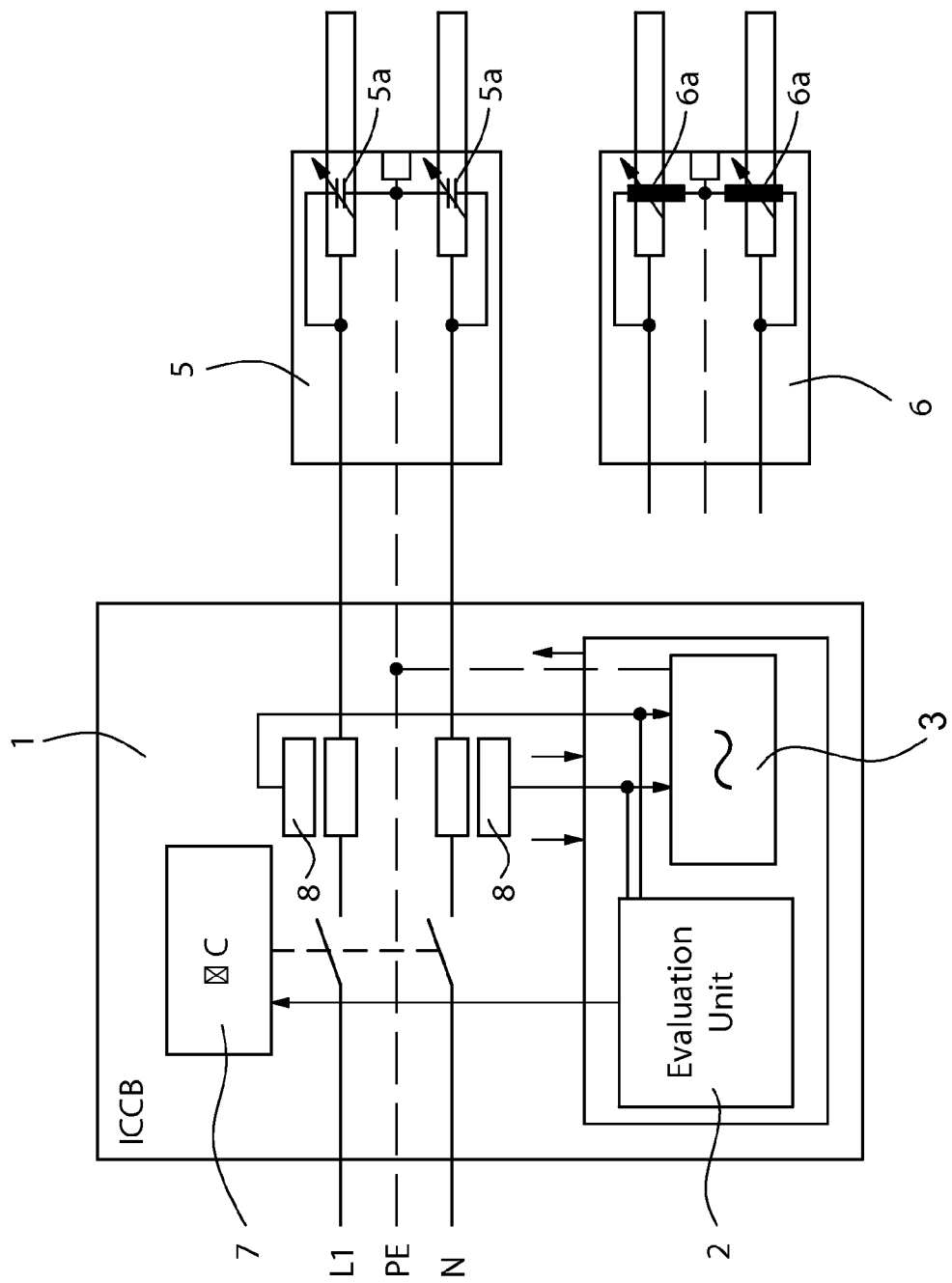
FIG. 2 is a schematic diagram of a device for monitoring the temperature in a power plug by using inductive signal coupling.

FIG. 2 illustrates a modification of the embodiment shown in FIG. 1. In principle, the modified embodiment works like the embodiment of FIG. 1. The only difference is that instead of coupling capacitors 4 for coupling the signal out of the conductor L1 and the neutral conductor N, coupling inductors 8 are provided, which likewise reliably couple the AC voltage signal out of the conductors L1, N in an electrically isolated way. In other respects, the circuit of FIG. 2 works just as the circuit of FIG. 1.

FIG. 3 illustrates a section of the embodiments of FIGS. 1 and 2. The section includes variable capacitors 5a. In addition, a transmission block formed of additional inductors 9 and capacitors 10 is present in the plug connector. The transmission block represents a low-pass filter, which prevents high-frequency signals from being fed into the circuit from the power grid and the signal from the signal generator 3 from spreading and causing disturbances.

The invention claimed is:

1. A device for measuring the temperature in a conductor, the device comprising:
    at least one temperature sensor emitting a signal being transported through the conductor, the signal having a frequency changing due to a temperature change;
    an evaluation unit;
    a signal generator; and
    at least one of a neutral conductor or a protective conductor, said signal generator feeding-in a signal through said protective or neutral conductor;
    coupling elements inductively or capacitively coupling the signals out of the neutral or conductor into the signal generator and/or evaluation unit and coupling elements inductively or capacitively coupling the signals out of the conductor into said evaluation unit for measuring the temperature in the conductor.

2. The device for measuring the temperature in a conductor according to claim 1, wherein said at least one temperature sensor has a variable capacitance or a variable inductance.

3. The device for measuring the temperature in a conductor according to claim 1, which further comprises a plug connector for connection with an electrical socket or a power outlet, said at least one temperature sensor in the conductor being disposed in said plug connector.

4. The device for measuring the temperature in a conductor according to claim 1, wherein the frequency of the signal emitted by said at least one temperature sensor changes abruptly at a predefined temperature in the conductor.

5. The device for measuring the temperature in a conductor according to claim 4, wherein the predefined temperature is 60° C.

6. The device for measuring the temperature in a conductor according to claim 1, wherein the signal has a frequency changed by said at least one temperature sensor as a function of the temperature.

7. The device for measuring the temperature in a conductor according to claim 6, wherein said signal generator, said protective conductor, said at least one temperature sensor, and the conductor form a resonant circuit having a frequency being registered by said evaluation unit.

8. The device for measuring the temperature in a conductor according to claim 7, wherein said resonant circuit is configured to cause the signals transmitted in the conductor to be in a frequency range being uncoupled from a power grid.

9. The device for measuring the temperature in a conductor according to claim 6, which further comprises an in-cable control box in a charging cable for electric vehicles, at least said evaluation unit and said signal generator being disposed in said in-cable control box.

10. The device for measuring the temperature in a conductor according to claim 9, which further comprises a neutral conductor, said in-cable control box including a microprocessor containing switches for interrupting at least one of the conductor or said neutral conductor.

11. The device for measuring the temperature in a conductor according to claim 10, wherein said microprocessor and said evaluation unit are connected for intercommunication.

* * * * *